US007636036B2

(12) United States Patent
Manneschi (10) Patent No.: US 7,636,036 B2
(45) Date of Patent: Dec. 22, 2009

(54) DETECTOR OF UNAUTHORISED OBJECTS IN A PROTECTED ACCESS ZONE

(76) Inventor: Alessandro Manneschi, 15, via XXV Aprile, I-52100 Arezzo (IT)

( * ) Notice: Subject to any disclaimer, the term of this patent is extended or adjusted under 35 U.S.C. 154(b) by 240 days.

(21) Appl. No.: 11/493,266

(22) Filed: Jul. 25, 2006

(65) Prior Publication Data
US 2007/0073492 A1   Mar. 29, 2007

(30) Foreign Application Priority Data
Jul. 26, 2005   (FR)   ................... 05 07938

(51) Int. Cl.
*B60Q 1/00* (2006.01)
(52) U.S. Cl. .................... 340/454; 340/438; 340/425.5; 324/200; 324/228
(58) Field of Classification Search ................. 340/454, 340/438, 425.5, 457, 460, 480, 614, 618, 340/627, 657, 659; 324/200, 228, 234, 236, 324/237, 262
See application file for complete search history.

(56) References Cited

U.S. PATENT DOCUMENTS

| | | | | |
|---|---|---|---|---|
| 4,012,690 A | * | 3/1977 | Heytow ....................... 324/243 |
| 4,146,231 A | * | 3/1979 | Merkle et al. ................ 473/269 |
| 5,039,981 A | * | 8/1991 | Rodriguez ................... 340/551 |
| 5,121,105 A | * | 6/1992 | Aittoniemi ................... 340/551 |
| 6,133,829 A | * | 10/2000 | Johnstone et al. ........... 340/551 |
| 6,359,582 B1 | * | 3/2002 | MacAleese et al. ........... 342/22 |
| 6,750,653 B1 | * | 6/2004 | Zou et al. .................... 324/318 |
| 6,819,241 B2 | * | 11/2004 | Turner et al. ................. 340/551 |
| 6,970,087 B2 | * | 11/2005 | Stis ............................. 340/551 |
| 2002/0008655 A1 | | 1/2002 | Haj-Yousef |
| 2002/0175849 A1 | * | 11/2002 | Arndt et al. ................... 342/22 |
| 2004/0113781 A1 | | 6/2004 | Stis |
| 2005/0043608 A1 | | 2/2005 | Haj-Yousef |
| 2005/0073307 A1 | | 4/2005 | Manneschi |
| 2005/0116825 A1 | | 6/2005 | Manneschi |
| 2006/0255798 A1 | * | 11/2006 | Crowley et al. ............. 324/300 |

* cited by examiner

*Primary Examiner*—Daniel Previl
(74) *Attorney, Agent, or Firm*—Blakely, Sokoloff, Taylor & Zafman LLP (57) ABSTRACT

A device for the detection of an unauthorised liquid or solid substance in a zone with protected access. The device includes a support base designed to receive a single foot, wearing a shoe of an individual to be checked, an electromagnetic field emitter/receptor operating at least at several frequencies in a specified range of frequencies, a position marker, on the support base, designed to impose a precise positioning of the foot wearing the shoe in relation to the emitter/receptor. The complex impedance is measured of the emitter/receptor influenced by a load which consists of the shoe and its contents, representing the complex dielectric characteristics of the shoe and of its contents. A mechanism is provided for supplying information associated with the measured complex impedance and therefore with the nature of the contents of the said shoe of the individual to be checked.

38 Claims, 6 Drawing Sheets

DETECTOR OF UNAUTHORISED OBJECTS IN A PROTECTED ACCESS ZONE

This present invention concerns the area of detectors designed for the detection of unauthorised objects in a zone with protected access.

This present invention applies in particular to the detection of liquid or solid substances.

Nowadays, it appears to be necessary to check, with a high degree of reliability, attempts to introduce or remove unauthorised liquid or solid substances into or out of a sensitive zone.

The problem therefore covers a very broad range of situations which encompass, in particular but not exhaustively, attempts to introduce dangerous liquid or solid substances into a protected zone, such as a store, a school, a station, or a public or private organisation.

Means have already been proposed that allow the examination of liquid or solid substances such as means for examination by x-rays for example. However, these means cannot be used to determine the nature of the liquid or solid substance analysed. Such examination means in fact only allow classification into two categories, namely organic materials and inorganic materials. They cannot be used to distinguish between two organic materials.

More precisely, it now appears that individuals who attempt to fraudulently remove a liquid or solid substance from a protected zone, such as in the case of theft within a company for example, or who attempts to introduce an unauthorised liquid or solid substance, most frequently use their shoes and/or socks to hide the objects in question.

This phenomenon essentially seems due to the fact that this part of the human body is difficult to be checked easily, either visually or by manual feel.

In practice at the present time, no device proposed up to now allows one to determine the nature of liquid or solid substances.

Thus on certain sensitive sites one is currently obliged to invite people entering or leaving the site to remove their shoes, since the x-ray cannot be used directly on shoes that are still on the feet, as this would create a problem of exposing parts of the human body to ionising radiation.

This present invention therefore has as its objective to propose new means that allow one to improve reliability in the detection of liquid or solid substance in a zone with protected access.

This objective is attained in the context of this present invention, by virtue of a device that includes the following in combination:
- a support base designed to receive a single foot, wearing its shoe; of an individual to be checked,
- emission/reception means of an electromagnetic field covering at least several frequencies in a range of frequencies determined for the detection of a target liquid or solid substance,
- position marking means, on the support base, designed to impose a precise positioning of the foot wearing its shoe in relation to the emission/reception means,
- means for measuring the complex impedance of the emission/reception means influenced by the load consisting of the shoe and its contents, representative of the complex dielectric characteristics of the shoe and its contents, and
- means for supplying information relating to the complex impedance measured and therefore to the nature of the contents of said shoe of the individual to be checked.

In the context of this present invention, "at least several frequencies" refers to a number of frequencies greater than 1.

Thus, and as will be described in detail below, the invention differs from previous devices and/or previous uses by the fact that the device is designed to effect detection on a single foot (shoe) at a time, and therefore in succession on both feet (shoes).

Preferred but not limiting aspects of the device of this present invention are as follows:
- the support base includes a plate in the form of a step which includes on its upper surface the position marking means,
- the height of the support base is between 100 and 200 mm, and very preferably of the order of 150 mm,
- the width of the support base is between 450 and 700 mm, and very preferably of the order of 575 mm,
- the depth of the support base is between 500 and 900 mm, and very preferably of the order of 670 mm,
- the position marking means include an imprint design,
- the imprint design includes a frame, preferably rectangular,
- the frame has a length of between 300 and 500 mm, preferably of the order of 400 mm, and a width of between 110 and 250 mm, preferably of the order of 180 mm,
- the position marking means include a mechanical end-stop,
- the mechanical end-stop is designed to act as a stop for the heel of a shoe.
- the device includes means for delivering visual or audible messages guiding the user during the successive stages of the detection process,
- the device includes random sorting means for the random designation of individuals conducted toward one or more additional tests,
- the device includes means for the sampling of vapours or particle traces, such as, drugs or explosives for example, and for analysis of these vapours or traces,
- the sampling means include intake nozzles on the support base,
- the device includes two vertical panels projecting from the support base, and these vertical panels include intake nozzles for the sampling of vapours or particle traces,
- the height of the vertical panels is between 300 and 900 mm,
- emission/reception means partially or totally surround the heel of the shoe, or surround the whole sole of the shoe,
- the means for supplying information include means for comparing the measured complex impedance with predetermined reference values for the same range of frequencies, and for generating an alarm when the measured complex impedance is different from the reference values,
- the means for supplying information associated with the measured complex impedance include means for indicating the nature thus detected of the contents of the shoe, or at least the family of these contents,
- the emission/reception means of an electromagnetic field are designed to sweep the range of frequencies ranging from a few Hz to a few GHz,
- the means for measuring the complex impedance are designed to measure the latter over a multiplicity of sampled frequencies in the range covered by the emission/reception means,
- the means for comparing the measured complex impedance are designed to compare the latter with reference values contained in a memory, the device includes a sensor designed to detect the positioning of the foot, wearing its shoe, of the individual to be checked, the device includes manually-operated means for initiating the switching-on of the electromagnetic field emission/reception means.

the electromagnetic field emission/reception means are of the inductive type, the electromagnetic field emission/reception means are of the capacitive type, the electromagnetic field emission/reception means are composed of transmission lines, the emission/reception means simultaneously employ an inductive transducer and a capacitive transducer, in particular for the detection of metal parts in the shoe, the device also includes ionising or radioactive radiation detection means, in order to supply information associated with the presence or the absence of a product emitting ionising or radioactive radiation in a zone of the individual between the sole of the shoe and the knee of the individual to be checked the ionising or radioactive radiation detection means are placed underneath the support base on the face opposite to that which includes the position marking means, the design also includes an imprint, the ionising or radioactive radiation detection means include a tube holding a gas whose composition is chosen to generate an ionising discharge during the detection of active radiation, with the ionising discharge used to generate an electric pulse, the tube is positioned directly below the stamped design, the tube is positioned in a plane of symmetry of the stamped design, the tube extends more or less over the whole length of the stamped design, the ionising or radioactive radiation detection means include means for detecting the electric pulse generated by the tube, the means for detecting the electric pulse are placed underneath the base, in a peripheral region of the imprint, the ionising or radioactive radiation detection means are fixed to the base.

Other characteristics, objectives and advantages of this present invention will appear on reading the detailed description that follows, and with reference to the appended drawings, provided by way of non-limiting examples and in which.

We will begin with a description of the general make-up of an appliance structure according to this present invention illustrated in the appended figures.

Figures 1, 2:
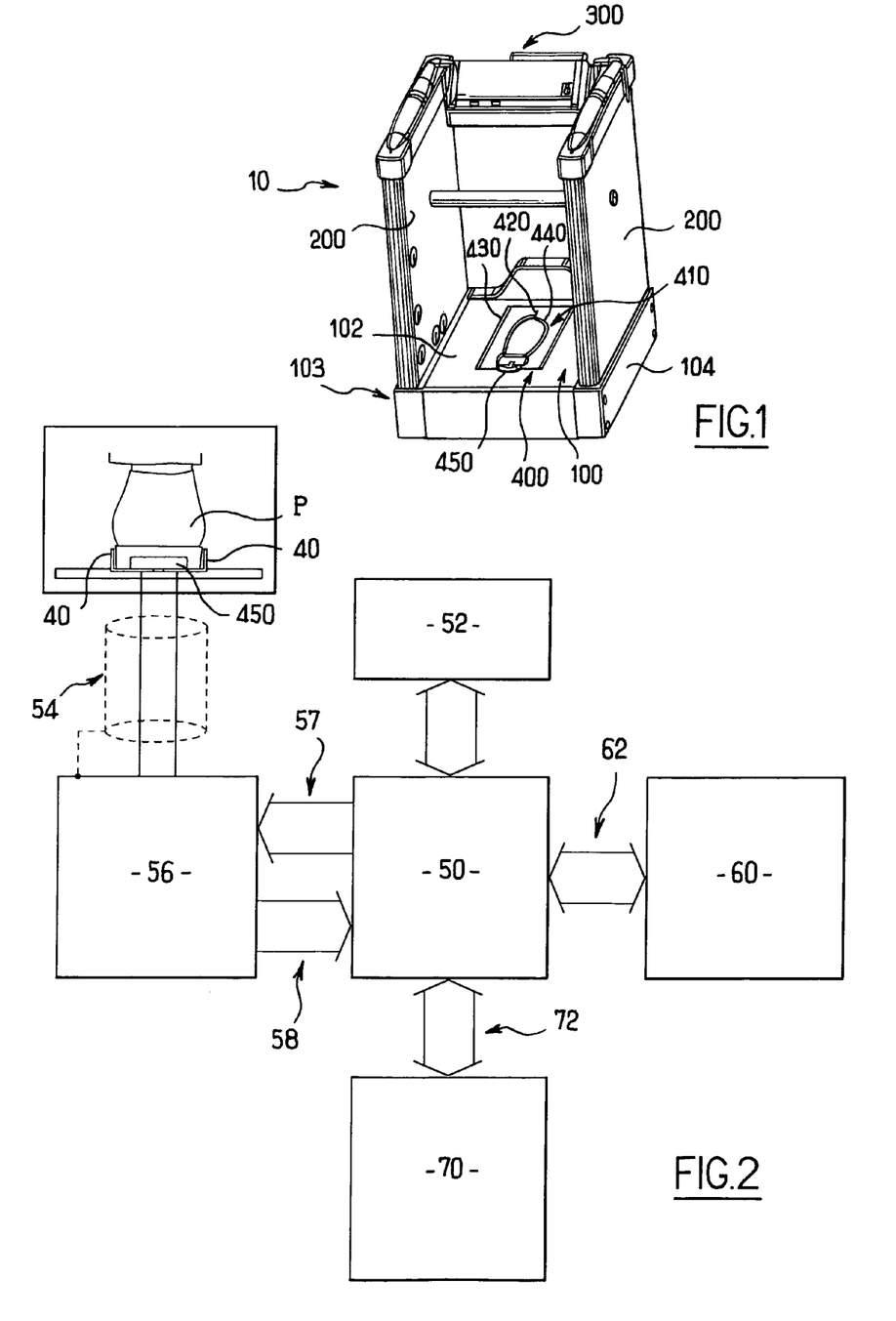
FIG. 1 represents a schematic view in perspective of the structure of a device according to this present invention.
FIG. 2 represents a schematic view in the form of functional blocks of elements making up the device illustrated in FIG. 1.

This structure 10 preferably includes:
a support base 100,
two symmetrical side panels 200, and
a data module 300.

The support base 100 has the geometry of a rectangular plate in the form of a step. Its upper surface 102 is flat.

The dimensions of the support base 100 are preferably as follows:
width between 450 and 700 mm, typically of the order of 575 mm,
depth between 500 and 900 mm, typically of the order of 670 mm, and
height between 100 and 200 mm, typically of the order of 150 mm.

The two vertical side panels 200 have a generally rectangular outline. They are flat and parallel to each other. The two panels 200 project upward, above the base 100, in a position adjacent to its lateral edges 103, 104. The two side panels 200 thus form, in combination with the underlying support base 100, a channel capable of accommodating the foot of a user wearing a shoe.

The dimensions of the panels 200 are typically as follows:
width corresponding to the depth of the support base 100,
height between 300 and 900 mm, typically of the order of 690 mm.

The structure in the form of a step proposed for the support base 100, typically with a height of the order of 150 mm, described previously, is designed so that the person examined does not need to step up onto a plinth, with the risk of falling and psychological shock resulting from exposure to other people in the vicinity. In fact, the use of a support base 100 designed to accommodate a single foot requires only a movement like the first step onto a ladder, placing the foot into a clearly-indicated zone.

In relation to previous designs, such a stepped structure has the following advantages:

the preparation to mount a step is a normal day-to-day action which requires no particular instruction for its correct execution, this same operation requires no physical effort, even on the part of an elderly person or a pregnant woman and in particular, does not require a large physical effort, like that required to mount a podium for example, the structure in the form of a step allows distancing from the floor of the antennae for emission and reception of electromagnetic fields, composed of coils built into the side panels 200, thereby reducing the risks of coupling with any metal structures incorporated into the floor, such a structure allows one to effect the examination of a single shoe at a time in natural mode, and this results in a structure that is compact in relation to a podium onto which a whole person must mount, as with certain devices proposed in previous designs.

An entry and/or programming keyboard, a display unit and indicating means (luminous and/or sound) of network and alarm presence. In this regard, the invention is of course not limited to the particular methods of implementation represented in the appended figures.

The data module 300 also preferably includes means for supplying video and/or audio messages guiding the user during all of the detection process. Preferably, this module 300 successively supplies messages with the following functions:
to indicate that the device is ready for detection, such as the "READY" message, for example, to invite the individual to place his or her foot or shoe on the imprint provided for this purpose, which will be described in greater detail below, as with the message "PLACE SHOE", for example, to indicate to the individual that the detection has been executed successfully without detecting an alarm, and inviting him either to repeat the action with the second shoe, or to remove it, such as with the messages "PASSED" or "REMOVE" for example.

Quite obviously, the means 300 preferably also include processing means designed to make use of the electric signals obtained from the detection means which will be described in what follows.

We will now describe the preferred geometry of the means forming the positioning markers according to this present invention and provided on the upper surface 102 of the support base 100.

These position marking means have the general reference of 400.

They include preferably, an outline 410 combined with an end-stop 450.

The outline 410 itself preferably includes three elements in combination: a median line 420, a frame 430 and an imprint 440.

The median line 420 lies parallel to the side panels 200 and midway between them. It is centred on the frame 430 and preferably of the same length as the latter or shorter.

The frame 430 is preferably a rectangular frame including two large sides parallel to each other and parallel to the median line 420 and parallel to the side panels 200, and two small sides parallel to each other, perpendicular to the large sides, and linking the latter.

The dimensions of the frame 430 are preferably as follows:
  width (or the length of the small sides 436, 438) between 110 and 250 mm, typically of the order of 180 mm,
  length (or the length of the large sides 432, 434) preferably between 300 and 500 mm, typically of the order of 400 mm.

The general dimensions of the imprint 440 are preferably as follows:
  length or maximum dimension parallel to the median line 420 between 250 and 350 mm, typically of the order of 300 mm, and
  the width dimension, that is perpendicular to the median line 420 between 100 and 180 mm, typically of the order of 136 mm.

The end-stop 450 can be formed by any appropriate method of implementation. It preferably consists of a slightly incurving projection provided in the zone that is common to the small sides of the frame and to the rear part of the imprint 440, to act as a locating point for the heel of the shoe.

The positioning imprint 400 can be drawn or engraved onto the upper surface 102 of the step 100. The end-stop 450 forms a reference stop, in relief, which is used to impose the position of the heel of the shoe, and therefore allows precise repeated positioning of the shoe in relation to the emission/reception means which will be described in more detail in what follows. In fact the applicant has determined that such a precise repeated positioning is essential for a reliable analysis.

We will now describe in greater detail the emission/reception means of the device of this present invention.

The latter depends essentially on the following approach.

The dielectric materials have four basic polarisations: electronic, ionic, dipole and migrational.

Each type of polarisation is characterised by an establishment time, called the rise time. If the electromagnetic excitation field has a pulse that is greater than the inverse of the rise time, then polarisation cannot take place. As a consequence, the polarisation is present only at frequencies below the cutoff frequencies and is absent at the higher frequencies. In the transition zone, we observe a phenomenon of energy loss in the dielectric due to the rotation of the dephased molecules in relation to the excitation field.

The rise times for the electronic polarisation are from $10^{-14}$ to $10^{-15}$ s, that is in the optical area. Such a range of frequencies is difficult to work with on the industrial scale, since the foot, wearing its shoe, of an individual to be checked can frequently be partially or completely opaque.

Ionic polarisation has a rise time of between $10^{-13}$ and $10^{-14}$ s, which is very close to the electronic relaxation time. This is also therefore difficult to work with.

Dipole polarisation is characteristic of the polar dielectrics (such as water for example).

Contrary to electronic and ionic polarisations, which have no inertia, dipole polarisation persists for a certain time after removal of the excitation. Dipole polarisation reduces with an exponential law and a time constant, called the relaxation time, of between $10^{-6}$ and $10^{-11}$ s, that is in the radio frequency area. Electromagnetic waves at these frequencies can pass through glass, plastics and other dielectric materials. The Applicant has thus determined that these electromagnetic waves can be used for examination of the foot, wearing its shoe, of an individual to be checked.

Migrational polarisation is present in certain dielectrics, in particular in heterogeneous materials, which contain impurities. In this case, the charges move very slowly and the rise time can be several seconds, minutes, or sometimes even hours. As a result, this type of polarisation is measurable only at very low frequency.

Figure 3:
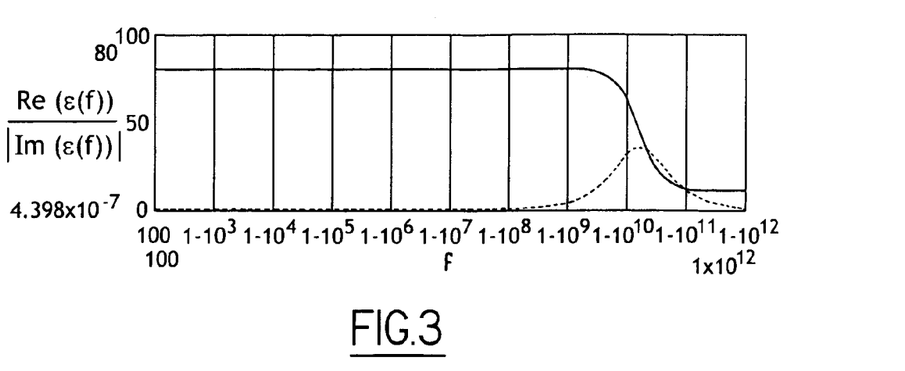
FIG. 3 represents the real part and the imaginary part of the measured complex impedance in the case of a load composed of water, over a broad range of frequencies, FIG. 4 schematically represents the positioning of a shoe in relation to emission/reception means implemented according to a first variant, FIG. 5 schematically represents the positioning of a shoe in relation to emission/reception means implemented according to a second variant.

Water, which is a polar liquid, as are all liquids with a water base, has a relaxation time of the order of $10^{-11}$ s at ambient temperature, corresponding to a frequency of about 16 GHz. Measurement of the complex dielectric constant at frequencies below that of relaxation shows a high real part and limited losses (distilled water) as illustrated in FIG. 3 attached.

Saturated hydrocarbons CnH(2n+2) are non-polar molecules or have a very low polar dielectric moment. As a result they do not have a dipole polarisation phenomenon, and the value of the real part of the dielectric constant is low (relative dielectric constant of the order of 2). The losses in the hydrocarbons are negligible up to very high frequencies. If a molecule of hydrocarbon loses its symmetry, as in the case of ethyl or methyl alcohol for example, we observe the appearance of an electric dipole moment and, as a result, a constant greater than that obtained in the case of the hydrocarbons, and a resonance phenomenon at the dipolar relaxation frequency.

The physical phenomena described above have been known the end of the 1930s (see Peter Debye Nobel Lecture, 1936, for example).

However, they have not been employed up to now for the effective examination of the foot, wearing its shoe, of an individual to be checked.

FIG. 2 illustrates, under the reference P, a foot, wearing its shoe, of an individual to be checked, and in which we can see the end-stop 450. Preferably the electromagnetic sensor or sensors intended to measure the complex dielectric characteristics of the shoe and of its contents are placed at the heel of the shoe, on either side of the longitudinal axis of the foot.

More precisely, one part of these means 40 for the emission/reception of an electromagnetic field lie vertically at the outside of the base 100 in planes parallel to the side panels 200, at the rear part of the imprint 440.

Preferably, the part of the emission/reception means 40 which lies vertically at the outside has a height that is less than the height of standard sole. This prevents the emission/reception means 40 from being influenced by the load consisting of the blood of the foot of the individual to be checked (the blood being a polar liquid).

These electromagnetic field emission/reception means are preferably formed from one or more transducers (antennae) 40 connected by means of a connection network 54, an electromagnetic measuring network 56 and a bus 57, 58, to a generator 50 designed to emit an electromagnetic wave. Typically the generator 50 is designed to cover the range of frequencies from a few Hz such as 5 Hz for example, to a few GHz such as 20 or 50 GHz for example. The generator 50 is operated either manually by an operator when an individual to be checked places his or her foot, wearing its shoe, onto the imprint 440, or automatically under the control of a sensor 52 designed to detect the presence of a foot, wearing its shoe, of the individual to be checked.

The electromagnetic field emission/reception means 40 can be implemented in several ways.

In one method of implementation, these means 40 are formed from a simple coil forming the emitter and receiver, connected by a 2-wire network 54 to means 56.

Figure 5:
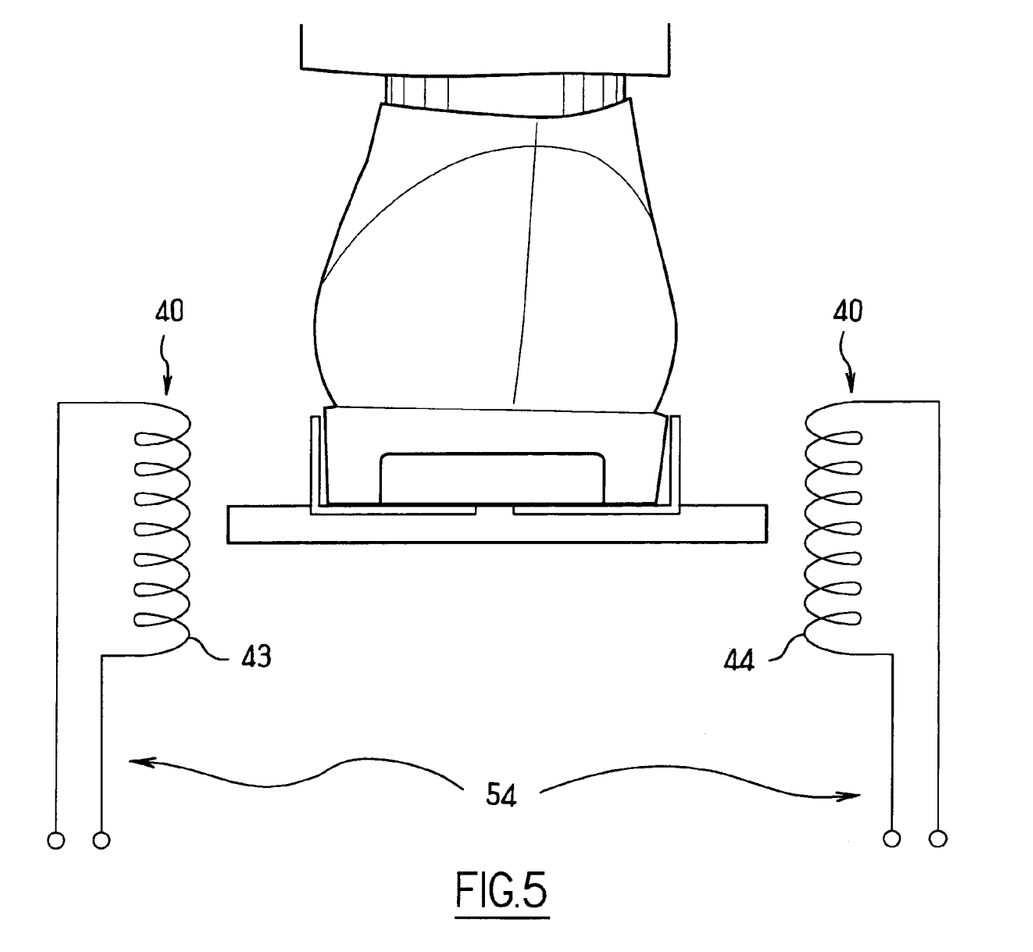

In another method of implementation illustrated in FIG. 5, the means 40 are formed from two coils 43, 44 forming the emitter and receiver, respectively and alternately as appropriate, connected by a 4-wire network 54 to means 56.

Figure 4:
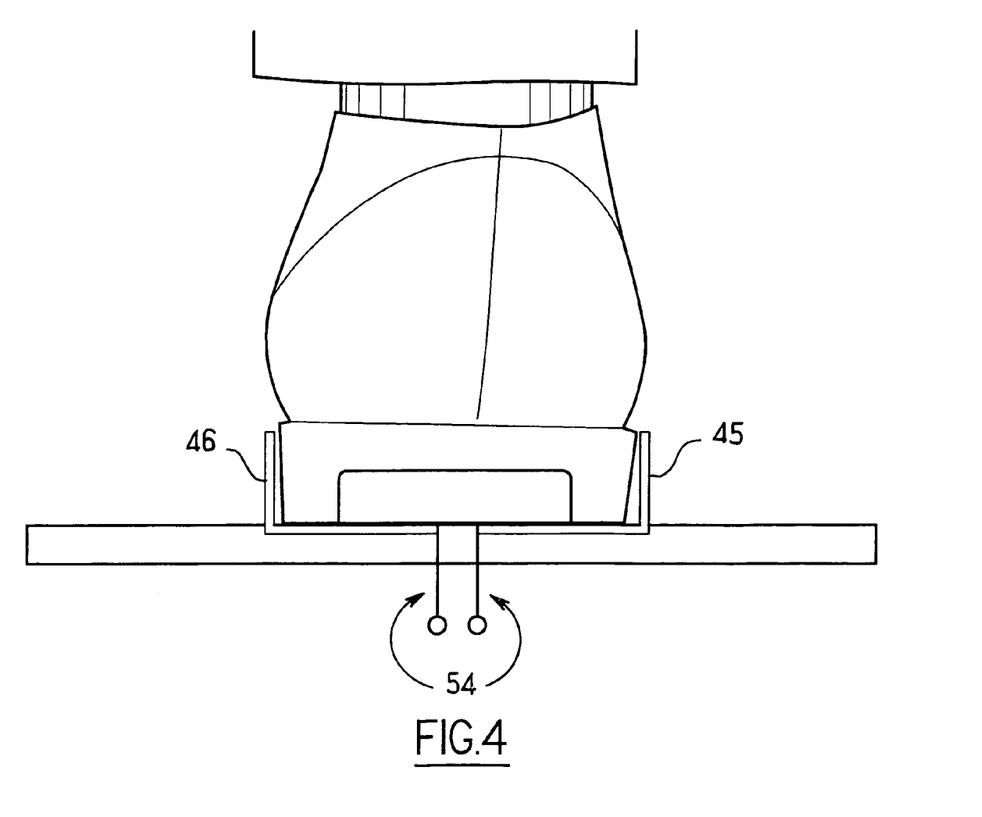

In another method of implementation illustrated in FIG. 4, the means 40 are formed from two plates 45, 46 of a capacitor, located on either side of the heel of the imprint and connected by a 2-wire network 54 to means 56.

In another implementation variant of this present invention, the means 40 are formed from transmission lines. Typically, these transmission lines operate in the microwave domain. They can be formed from 2-wire lines or slotted waveguides.

In addition, in the context of this present invention, use can be made of sensors that simultaneously employ an inductive transducer and a capacitive transducer. This arrangement can be used to determine that the growth of the real part of the complex dielectric constant is due to a metal object inside the shoe and not to liquid or solid substances with particular properties. This arrangement allows detection of the presence of metal screens that are liable to act as screens that interfere with the measurement. The inductive sensor, powered by an alternating power source in this case will produce eddy currents in the metal part. These currents will be measured by the processing device, and the comparison between the signals coming from the electric field transducer and the electric field transducer provides satisfactory detection.

Naturally, the number of means making up the emitters and/or receivers is not limited in any way and can be greater than those illustrated in the appended figures.

The professional engineer will understand, on reading the foregoing detailed description, that this present invention thus proposes an electromagnetic sensor for sweeping at high frequencies which can be used to measure the dielectric characteristics of the shoe and its contents.

The analysis means 50 are also designed to measure the complex impedance of the emission/reception means 40 influenced by the load consisting of the shoe and its contents, representing the complex dielectric characteristics of the sole and the heel of the shoe and its contents. More precisely, the analysis means 50 are designed to measure this complex impedance at several sampled frequencies in the aforementioned excitation range of a few Hz to several GHz. Typically, the analysis means 50 thus operate over a number of between 10 and 50 frequencies, and advantageously over some thirty frequencies.

In addition, the analysis means 50 are designed to supply information associated with the measured complex impedance and, as a consequence, the nature of the contents of the shoe detected.

Preferably, these means 50 are designed to compare the complex impedance thus measured with predetermined reference values in the same range of frequencies, and to generate an alarm when the measured complex impedance is different from the reference values.

FIG. 2 shows a memory 60 coupled to the analysis means 50 by a communication bus 62, and in which the predetermined reference values in the working range of frequencies can be stored. FIG. 2 also shows, under the reference 70, alarm means, present preferably on the control panel of the data module 300, connected to analysis means 50 by a communication bus 72 and designed to generate an audible and/or visible alarm when the measured complex impedance is different from the reference values.

In a variant, the reference values can be calculated by the analysis means 50 and not contained in a memory 60.

In addition, according to another variant, the means 70 can be designed to directly indicate the nature of the contents of the shoe, or at least the family of the contents, instead of or in addition to the aforementioned alarm means.

Once the foot wearing the shoe to be checked is in position, the generator 50 is activated either manually or automatically, and the complex impedance of the network formed by the emission/reception circuit 40, influenced by the shoe and its contents, is measured.

The measured impedance, which is dependent on the emission/reception circuit and the load, is composed of a real part associated with the losses (conductance) in the contents of the shoe analysed, and an imaginary part associated with the dielectric characteristics.

Measurement of the impedance is effected at different frequencies in the chosen range.

Naturally this present invention is not limited to the particular methods of implementation which have just been described, but extends to any variant that complies with its spirit.

It will also be seen that, in the context of this present invention, the sensors 40 are preferably designed to cover at least a substantial part of the shoe, or even the whole of the latter. This guarantees a high level of security in the analysis.

When a single transducer is used, this acts simultaneously or successively as emitter and receiver.

When several transducers are used, all combinations are possible, meaning that these transducers can act simultaneously or successively as emitter and/or receiver.

Naturally this present invention is not limited to the particular methods of implementation which have just been described but extends to any variant that complies with its spirit.

Neither is it limited to a particular application, and can apply to any sensitive area such as a school, station, private or public company, stadium, theatre, exhibition hall, etc.

According to one implementation variant, the end-stop 450 for the heel can be omitted. In this case however, it is then preferable to have several coils distributed longitudinally, that is parallel to the median line 420, in order to optimise detection and to detect even the weakest signal coming from the emission/reception means in order to best overcome external interference.

As mentioned previously, the device according to this present invention preferably includes random sorting means for the random designation of individuals conducted toward one or more additional tests. The additional test or tests can consist, for example, of manual feeling or an automatic examination device, such the sampling and analysis of vapour for example, or particle traces such as drugs or explosives for example.

As indicated previously, the device according to this present invention can be complemented by means for the aspiration of vapour and/or traces of sensitive material, such as drugs or explosives for example, possibly coming from shoes. Such aspiration means are preferably incorporated into the side panels 200 and into the support base 100 forming the step. The aspiration means can consist of a multiplicity of intake nozzles located on the side panels 200.

These intake nozzles can be followed by filters and checking means. The latter can themselves be connected to the input of a pump operated by a motor. The output of the pump can be connected to an appropriate detector, such as of the mass spectrometer type for example. The detector and the motor can be connected to and by a processing unit.

According to one implementation variant, the intake nozzles can be replaced directly by specialist monolithic sensors connected electrically to the processing unit.

In relation to previous designs, this present invention offers the following advantages in particular:

- a high and consistent level of checking security and safety,
- a high fluidity of passage with no need for specialist analysis staff,
- elimination of the cost of dedicated specialist staff in certain known applications using manual checking of the shoes,
- the advantage of convenience for the public by removal of the irritation caused by the removal and replacement of the shoes, and by the loss of time associated with such an operation,
- elimination of the need for x-ray appliances, required in certain known examination applications,
- the device is light and compact, and therefore easy to move and to adapt to any site,
- examination of the shoes is not effected in differential mode, as is the case in certain known appliances, but in an absolute manner, shoe by shoe. Thus each shoe is evaluated separately and the detection of the most critical liquid or solid targets, that is of the minimum signal, is effected independently of any comparison with the other. The Applicant has determined that this arrangement offers a guarantee of the secure interception of the minimum target signals in all transportation conditions.
- in terms of ergonomic design, the appliance is simple and convenient. It does not constrain the person examined to engage in any strange behaviour or to adopt any embarrassing positions. The analysis time can be reduced to a minimum.
- the use of a support base in the form of a step (associated with position marking means) guarantees detection on a single shoe, with the second shoe resting on the floor being kept outside of the detection field.

Figure 6:
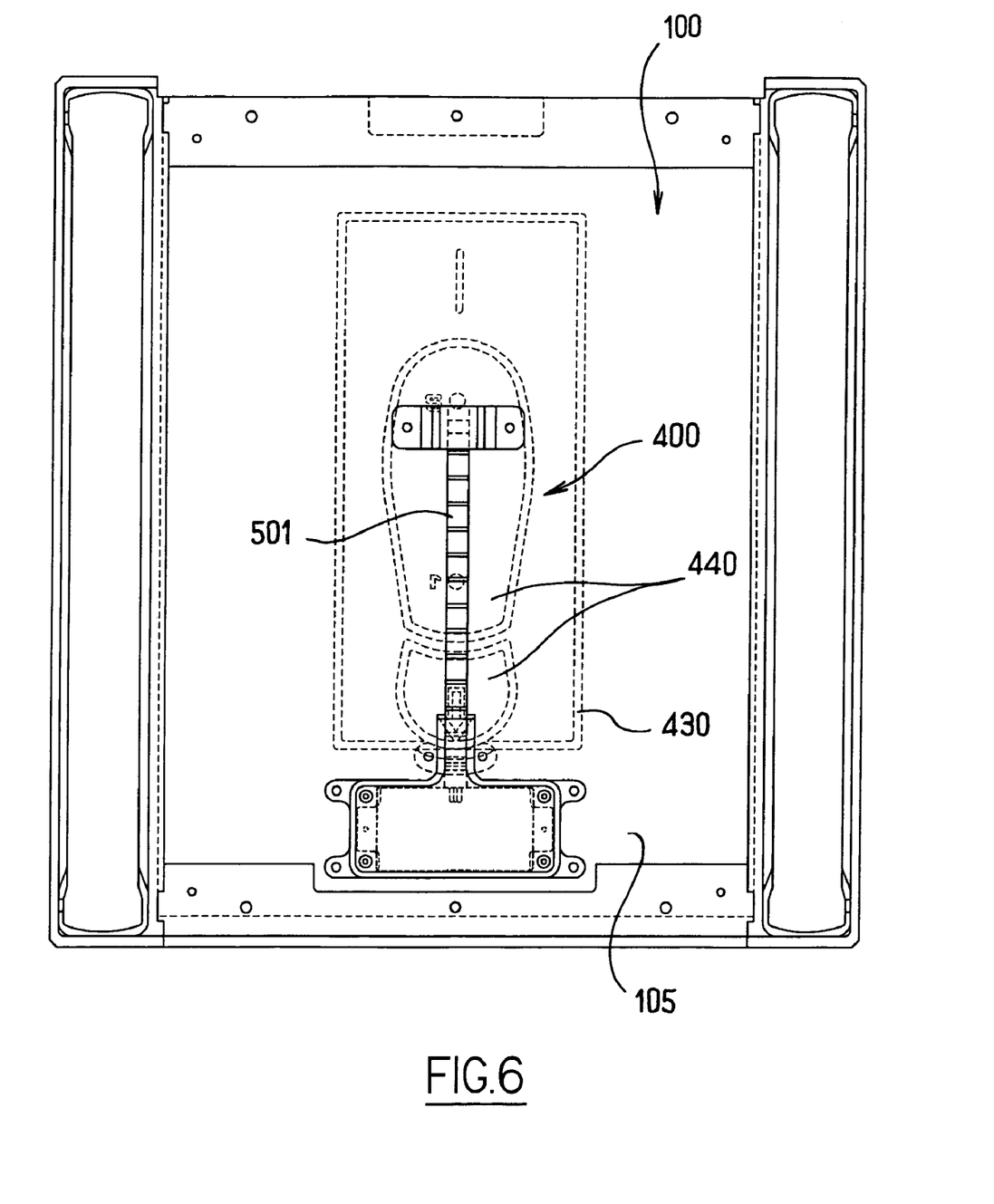
FIG. 6 is a view from below of a method of implementation of the device according to the invention, including ionising or radioactive radiation detection means.
Figure 7:
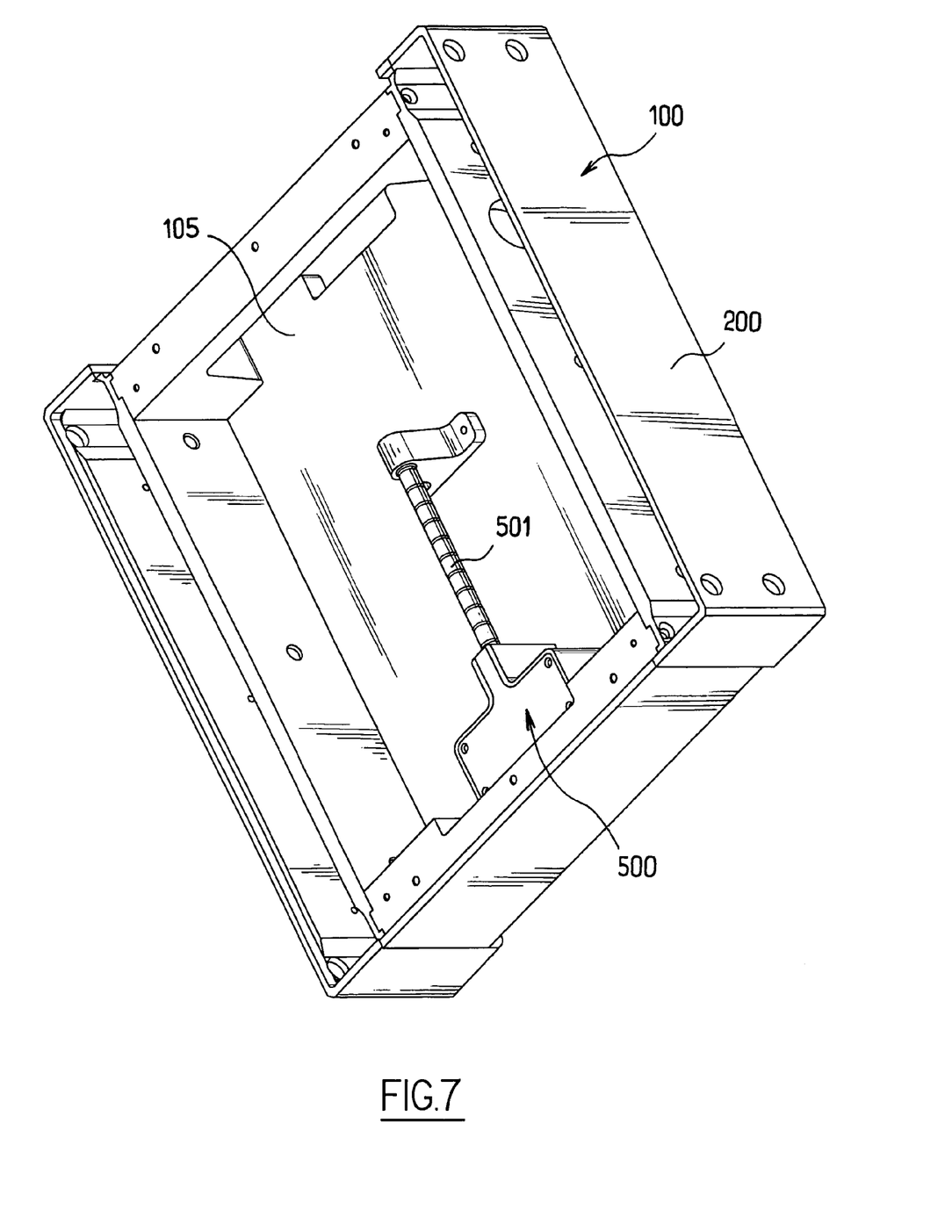
FIGS. 7 and 8 are views in perspective of a portion of the method of implementation of the device illustrated in FIG. 6.
Figure 8:
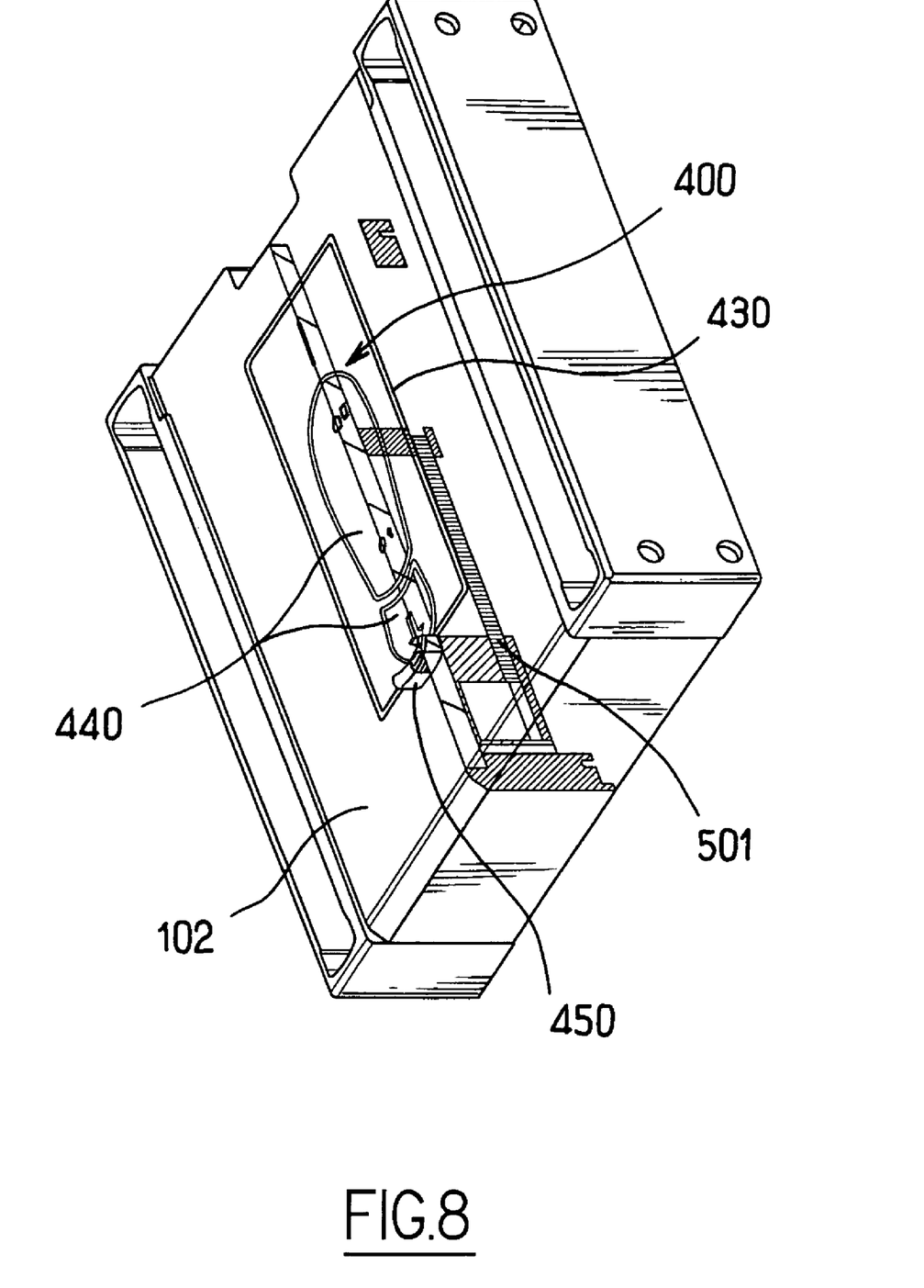

In one method of implementation, illustrated in FIGS. 6 to 8, the device described above can include ionising or radioactive radiation detection means in the device.

As illustrated in FIGS. 6 to 8, the ionising or radioactive radiation detection means 500 can be placed underneath the support base 100.

This results in increased compactness of the device, and protects the ionising or radioactive radiation detection means 500 against impact or shock.

The ionising or radioactive radiation detection means can be implemented in several ways. They can be formed from any structures known to the professional engineer, and in particular any structures designed to convert a detected ionising ray into a usable electronic signal.

It can, for example and non limitatively, consist of a detector of the Geiger type.

In the method of implementation illustrated in FIGS. 6 to 8, the ionising or radioactive radiation detection means 500 include a tube 501 in which a gas is trapped, whose composition is chosen to generate an ionising discharge during the detection of active radiation, and thus an electric pulse.

Advantageously, the ionising or radioactive radiation detection means 500 can also be composed of a scintillation detector capable of converting the energy detected into luminous scintillations which are then converted into an electrical signal by a network of photomultipliers. Many scintillators have been proposed for this purpose, including those based on sodium iodide, caesium iodide or indeed bismuth germanate.

The ionising or radioactive radiation detection means 500 are placed at any appropriate location and preferably fixed under the base 100, on the face opposite 105 to that which includes the position marking means 400. This increases the chances of detecting any radioactive product contained in the shoe or the sock of the individual checked, due to the proximity of the checked shoe to the ionising or radioactive radiation detection means 500.

Advantageously, the tube 501 is positioned directly below the imprint 440, in a plane of symmetry of the imprint 440.

In addition, in the method of implementation illustrated in FIGS. 6 to 8, the tube 501 extends more or less over the whole length of the imprint 440. This results in optimal detection over all of the region covered by the shoe.

The ionising or radioactive radiation detection means 500 include means 502 for detection of the electric pulse generated by the tube 501.

Advantageously, these electric pulse detection means 502 are also placed underneath the base 100, in a peripheral region of the outline 410, and fixed to the base 100.

The ionising or radioactive radiation detection means 500 are used to supply information associated with the presence or absence of a product emitting ionising or radioactive radiation in a zone of the individual between the sole of the shoe and the knee of the individual to be checked.

The ionising or radioactive radiation detection means 500 are designed to operate in masked time, in parallel with the means for measurement of the complex impedance described below.

The invention claimed is:

1. A device for the detection of unauthorised liquid or solid substances in a zone with protected access, wherein said device includes the following in combination:
    a support base (100) designed to receive a single foot, wearing a shoe, of an individual to be checked,
    emission/reception means (40) of an electromagnetic field at least at several frequencies in a specified range of frequencies,
    position marking means (400), on the support base (100), designed to impose a precise positioning of the foot, wearing the shoe, in relation to the emission/reception means (40),
    means (50) for measuring the complex impedance of the emission/reception means (40) influenced by a load consisting of the shoe and the shoe's contents, representing the complex dielectric characteristics of the shoe and of the shoe's contents, and means (50) for supplying information associated with the measured complex impedance and therefore with the nature of the contents of said shoe of the individual to be checked.

2. The device according to claim 1, wherein the support base (100) includes a plate in the form of a step, the upper face of said plate including the position marking means.

3. The device according to claim 1, wherein the height of the support base (100) is between 100 and 200 mm, and very preferably of the order of 150 mm.

4. The device according to claim 1, wherein the width of the support base (100) is between 450 and 700 mm, and very preferably of the order of 575 mm.

5. The device according to claim 1, wherein the depth of the support base (100) is between 500 and 900 mm, and very preferably of the order of 670 mm.

6. The device according to claim 1, wherein the position marking means (400) include an imprint design (410).

7. The device according to claim 6, wherein the imprint design (410) includes a frame, preferably rectangular.

8. The device according to claim 7, wherein the frame has a length of between 300 and 500 mm, preferably of the order of 400 mm, and a width between 110 and 250 mm, preferably of the order of 180 mm.

9. The device according claim 6, wherein the position marking means (400) include a mechanical end-stop (450).

10. The device according to claim 9, wherein the mechanical end-stop (450) is designed to act as a stop for a heel of the shoe.

11. The device according to claim 6, wherein the imprint design includes an imprint.

12. The device according to claim 11 in combination with claim 30, wherein a tube (501) is positioned directly below the imprint (400).

13. The device according to claim 11 in combination with claim 30, wherein a tube (501) is positioned in a plane of symmetry of the imprint (440).

14. The device according to claim 11 in combination with 30, wherein a tube (501) extends over the whole length of the imprint (440).

15. The device according to claim 11, wherein said device also includes ionising or radioactive radiation detection means (500), in order to supply information associated with the presence or the absence of a product emitting ionising or radioactive radiation in a zone of the individual between the sole of the shoe and a knee of the individual to be checked, wherein the ionising or radioactive radiation detection means (500) include means for detection (502) of the electric pulse generated by the tube (501), wherein the means (502) for detection of the electric pulse are placed underneath the base (100), in a peripheral region of the imprint.

16. The device according claim 1, wherein said device includes means (300) for delivering visual or 10 audible messages guiding a user during the successive stages of the detection process.

17. The device according to claim 1, wherein said device includes random sorting means (740) for the random designation of individuals conducted toward one or more additional tests.

18. The device according to claim 1 wherein said device includes means (800) for the sampling of vapours or particle traces, such as of drugs or explosives for example, and for the analysis of these vapours or traces.

19. The device according to claim 18, wherein the sampling means includes intake nozzles (800) on the support base (100).

20. The device according claim 1, wherein said device includes two vertical panels (200) projecting 30 from the support base (100), with the vertical panels (200) including intake nozzles (800) for the sampling of vapours or particle traces.

21. The device according to claim 20, wherein the height of the vertical panels (200) is between 300 and 900 mm.

22. The device according to claim 1, wherein emission/reception means (40) partially or totally surround the heel of the shoe, or surround all of a sole of the shoe.

23. The device according to claim 1, wherein the analysis means (50) for supplying information include means for comparing the measured complex impedance with predetermined reference values for the same range of frequencies, and to generate an alarm when the measured complex impedance is different from the reference values.

24. The device according to claim 1, wherein the analysis means (50) for supplying information associated with the measured complex impedance include means (70) for indicating the nature of the contents of the shoe or at least the family of these contents.

25. The device according to claim 1, the emission/reception means (40) of an electromagnetic field are designed to sweep the range of frequencies ranging from a few Hz to a few GHz.

26. The device according to claim 1, wherein the analysis means (50) for measuring the complex impedance are designed to measure the complex impedance over a multiplicity of sampled frequencies in the range covered by the emission/reception means.

27. The device according to claim 1, wherein the means for comparing the measured complex impedance are designed to compare the measured complex impedance with reference values contained in a memory (60).

28. The device according to claim 1, wherein said device includes a sensor (52) designed to detect the positioning of the foot, wearing the shoe, of the individual to be checked.

29. The device according to claim 1, wherein said device includes means for initiating the switching-on of the emission/reception means (40) of an electromagnetic field.

30. The device according to claim 1, wherein the emission/reception means (40) of an electromagnetic field are of the inductive type.

31. The device according to claim 1, wherein the emission/reception means (40) of an electromagnetic field are of the capacitive type.

32. The device according to claim 1, the emission/reception means (40) of an electromagnetic field are composed of transmission lines.

33. The device according to claim 1, the emission/reception means (40) simultaneously employ an inductive transducer (42) and a capacitive transducer (45, 46), in particular for the detection of metal parts in the shoe.

34. The device according to claim 1, wherein said device also includes ionising or radioactive radiation detection means (500), in order to supply information associated with the presence or the absence of a product emitting ionising or radioactive radiation in a zone of the individual between the sole of the shoe and a knee of the individual to be checked.

35. The device according to claim 34, the ionising or radioactive radiation detection means (500) are placed underneath the support base (100) on a face opposite (105) to that which includes the position marking means (400).

36. The device according to claim 34, wherein the ionising or radioactive radiation detection means (500) include a tube (501) in which a gas is trapped whose composition is chosen so as to generate an ionizing discharge during the detection of active radiation, the ionizing discharge being used to generate an electric pulse.

37. The device according to claim 34, wherein the ionising or radioactive radiation detection means (500) include means for detection (502) of the electric pulse generated by the tube (501).

38. The device according to 34, wherein the ionising or radioactive radiation detection means (500) are fixed to the base.

\* \* \* \* \*

UNITED STATES PATENT AND TRADEMARK OFFICE
CERTIFICATE OF CORRECTION

PATENT NO. : 7,636,036 B2
APPLICATION NO. : 11/493266
DATED : December 22, 2009
INVENTOR(S) : Alessandro Manneschi It is certified that error appears in the above-identified patent and that said Letters Patent is hereby corrected as shown below:

In Column 11, Claim 9, line 28, delete "according claim" and insert -- according to claim --.

Signed and Sealed this
Twenty-sixth Day of July, 2011

David J. Kappos
*Director of the United States Patent and Trademark Office*